United States Patent [19]
Uenoyama et al.

[11] Patent Number: 5,619,050
[45] Date of Patent: Apr. 8, 1997

[54] SEMICONDUCTOR ACCELERATION SENSOR WITH BEAM STRUCTURE

[75] Inventors: Hirofumi Uenoyama, Anjo; Kenichi Ao, Tokai; Masakazu Kanosue, Nagoya; Yasutoshi Suzuki, Okazaki; Yukihiro Takeuchi, Seto, all of Japan

[73] Assignee: Nippondenso Co., Ltd., Kariya, Japan

[21] Appl. No.: 399,345

[22] Filed: Mar. 6, 1995

[30] Foreign Application Priority Data

| Mar. 7, 1994 | [JP] | Japan | 6-036140 |
| Oct. 7, 1994 | [JP] | Japan | 6-244397 |

[51] Int. Cl.⁶ .................................................. H01L 29/82
[52] U.S. Cl. ..................... 257/254; 257/417; 257/418; 257/420; 73/514.21; 73/514.22; 73/514.36; 73/514.37; 73/DIG. 1
[58] Field of Search .................................... 257/417, 254, 257/418, 420; 73/514.21, 514.22, 514.36, 514.37, 514.23, 514.24, 514.38, DIG. 1

[56] References Cited

U.S. PATENT DOCUMENTS

| 4,674,319 | 6/1987 | Muller et al. | 257/418 X |
| 4,930,043 | 5/1990 | Wiegand | 73/514.24 X |
| 5,126,812 | 6/1992 | Greiff | 257/420 X |
| 5,326,726 | 7/1994 | Tsang et al. | 437/228 |
| 5,343,064 | 8/1994 | Spangler et al. | 257/418 X |
| 5,352,918 | 10/1994 | Thomas et al. | 257/417 |

FOREIGN PATENT DOCUMENTS

| 194953 | 4/1990 | European Pat. Off. . |
| 61-212052 | 9/1986 | Japan . |
| 9203740 | 5/1992 | WIPO . |

OTHER PUBLICATIONS

Core et al: "Fabrication Technology for an IntergratedSurface-Micromachined Sensor", Sonic State Technology Oct. 1993, pp. 39–47.

Nathanson, et al: "The Resonant Gate Transistor", I3EEE Transactions On Electron Divices, vol. ED–14, No. 3, Mar. 1967, pp. 117–132.

Nathanson, et al: "A Resonant–Gate Silicon Surface Transistor with High–Q Band–Pass Properties", Applied Physics Letters, vol. 7, No. 4, Aug. 15, 1965. pp. 84–86.

*Primary Examiner*—William Mintel
*Attorney, Agent, or Firm*—Cushman, Darby & Cushman IP Group of Pillsbury Madison & Sutro LLP

[57] ABSTRACT

A semiconductor acceleration sensor capable of reducing a leakage current and manufacturing method thereof is disclosed. A beam structure is disposed on a silicon substrate. The beam structure has a movable section, and the movable section is disposed spaced at a prescribed distance above silicon substrate. A movable electrode section is formed in one portion of movable section. Fixed electrodes made of an impurity diffusion layer are formed in silicon substrate to correspond to both sides of a movable electrode section. A peripheral circuit is formed in silicon substrate. The beam structure and the peripheral circuit are electrically connected by an electroconductive thin film, made of polysilicon. Then, when a voltage is applied to the beam structure, and a voltage is applied to both fixed electrodes, an inversion layer is formed, and an electrical current flows between the fixed electrodes. In the case where an acceleration is received and movable section is displaced, the electrical current flowing between the fixed electrodes changes.

11 Claims, 13 Drawing Sheets

SEMICONDUCTOR ACCELERATION SENSOR WITH BEAM STRUCTURE

CROSS REFERENCE TO RELATED APPLICATION

This application is based upon and claims the benefit of priority of the prior Japanese Patent applications No. 6-36140 filed on Mar. 7, 1994 and No. 6-244397 filed on Oct. 7, 1994, the contents of which are incorporated herein by reference.

BACKGROUND OF THE INVENTION

1. Field of the Invention

The present invention relates to a semiconductor acceleration sensor and manufacturing method thereof.

2. Related Arts

A semiconductor acceleration sensor having the differential-capacitance type semiconductor acceleration sensor in PCT WO 92/03740 which utilizes polysilicon as an electrode is disclosed. This kind of sensor is described with reference to FIGS. 18 and 19. FIG. 18 shows a plan view of the sensor and in FIG. 19 a cross sectional view taken along line E—E of FIG. 18 is shown.

A beam structure 63 is disposed on a silicon substrate 41. The beam structure 63 made of polysilicon is constructed of anchor sections 43, 44, 45, and 46 and movable section 42, disposed and spaced at a prescribed distance above silicon substrate 41. Further, movable section 42 comprises beam sections 47 and 48, a weight section 49, and a movable electrode section 50. That is, beam sections 47 and 48 are extended from anchor sections 43, 44, 45, and 46, and weight section 49 is supported in these beam sections 47 and 48. The movable electrode section 50 is formed in one portion of this weight section 49. On the one hand, a pair of fixed electrodes 51 corresponding to one movable electrode section 50 is disposed so that they are facing one another on silicon substrate 41. Then, in the case where an acceleration changes in a parallel direction (shown by Y in FIG. 18) on the surface of silicon substrate 41, the electrical capacitance between movable electrode section 50 and fixed electrode 51 is changed such that the capacitance of one side increases while the other side is reduced. Further, underlying electrode 52 having an impurity diffusion layer is formed in a region in silicon substrate 41 facing movable section 42; by making the electrical potential of this underlying electrode 52 is made equal to the electrical potential of movable section 42, movable section 42 being attracted towards silicon substrate 41 due to electrostatic force produced between silicon substrate 41 and movable section 42 is prevented.

Furthermore, the above differential capacitance semiconductor acceleration sensor is considered to be an improved MIS transistor-type semiconductor acceleration sensor.

The MIS transistor-type semiconductor acceleration sensor according to the prior work of the present inventors will be described with reference to FIGS. 20, 21, 22, and 23. FIG. 20 shows a plan view of the sensor, in FIG. 21 the cross sectional view taken along line F—F of FIG. 20 is shown, in FIG. 22 the cross sectional view taken along line G—G of FIG. 20 is shown, and in FIG. 23 the cross sectional view taken along line H—H of FIG. 20 is shown.

In a description of this sensor, concerning a device which achieves the same functions as the previously mentioned differential capacitance semiconductor acceleration sensor, by affixing the same numbers, that description is omitted. As shown in FIG. 20, movable electrode sections 53 and 54 functioning as gate electrodes are formed in movable section 42. In the meantime, as shown in FIGS. 20 and 22, two pairs of fixed electrodes (source and drain electrodes) 55, 56, 57 and 58, each composed of an impurity diffusion layer, are formed in both sides of movable electrode sections 53 and 54, respectively. Further, as shown in FIGS. 20 and 21, peripheral circuit 59 is formed in silicon substrate 41. This peripheral circuit 59 and beam structure 63 are electrically connected, and peripheral circuit 59 and fixed electrodes 55 to 58 are electrically connected; moreover, peripheral circuit 59 and underlying electrode 52 are electrically connected. More concretely, the electrical connection of peripheral circuit 59 and beam structure 63 is as shown in FIG. 24: a wiring material 60 such as Al—Si is extended from peripheral circuit 59, and this wiring material 60 and beam structure 63 are connected via impurity diffusion region 61. A voltage generated by this peripheral circuit 59 is applied to beam structure 63.

Then, a voltage is applied between beam structure 63 and silicon substrate 41, and a voltage is applied between fixed electrodes 55 and 56, and between fixed electrodes 57 and 58. In this condition, an acceleration changes in a parallel direction (shown by Z in FIG. 20) on the surface of silicon substrate 41, and variation in a current (drain current) between fixed electrodes 55 and 56, and between fixed electrodes 57 and 58, occurs due to displacement of movable electrode sections 53 and 54. This variation in current is measured by peripheral circuit 59 and applied acceleration is detected.

Here, as shown in FIG. 24, the electrical connection between peripheral circuit 59 and beam structure 63 is formed by impurity diffusion region 61. The problem became clear that, by means of this, leakage current occurs from impurity diffusion region 61 to the silicon substrate 41 side, giving rise to a loss of voltage applied to beam structure 63. That is, despite the prescribed voltage being produced by peripheral circuit 59, only the voltage not lost by the leakage current is applied to beam structure 63. Further, as shown in FIG. 23, channel 62 is formed between fixed electrodes (source and drain electrodes) 55 to 58 and underlying electrode 52, wherein leakage current occurs and there is also the problem of deterioration of sensor characteristics.

SUMMARY OF THE INVENTION

Therefore, an object of the present invention is to provide a semiconductor acceleration sensor and manufacturing method thereof capable of reducing leakage current.

A first aspect of the present invention is that, in a semiconductor acceleration sensor which detects an acceleration from a displacement of a movable section provided with a semiconductor substrate, a beam structure having the movable section disposed and spaced at a prescribed distance above the semiconductor substrate, and a peripheral circuit formed in the semiconductor substrate and electrically connected to the beam structure, an electroconductive thin film for connecting the beam structure to the peripheral circuit is provided.

According to the first aspect of the present invention, the beam structure and the peripheral circuit are connected electrically by the electro-conductive thin film. When, as in FIG. 24, the beam structure and the peripheral circuit are connected through an impurity diffusion layer formed in the semiconductor substrate, a leakage current occurs from the impurity diffusion layer. According to the invention, however, because no impurity diffusion layer for connecting between the beam structure and the peripheral circuit is provided, no leakage current occurs.

In a case where the electro-conductive thin film is disposed on a lower layer side in a portion connecting with the beam structure, the electro-conductive thin film can be the same material as a gate electrode of a MOS transistor formed in the peripheral circuit. When the electro-conductive thin film utilizes the same material as a gate electrode of a peripheral circuit MOS transistor, the number of manufacturing processes is not increased in order to form the electro-conductive thin film.

On the other hand, in a case where the electro-conductive thin film is disposed on an upper layer side in the connecting portion, the electro-conductive thin film can be an extruded metal wiring film extended from the peripheral circuit. When the beam structure and the peripheral circuit are electrically connected by only one layer of the wiring film extended from the peripheral circuit, there is only one electrical connection point in the wiring between the wiring film and the beam structure, and therefore the electrical connection point is restricted to the absolute minimum.

Here, it is desirable to thin down one portion of the beam structure in comparison with the other portions for the connecting portion; locate the connecting portion on an isolation film; and dispose the wiring film extended from the peripheral circuit on the thinned connecting portion. When the section in the beam structure connecting to the wiring film is made thin, the step becomes small, therefore step cutting in the wiring film does not occur. On the other hand, in a case where a wiring film is disposed in a point which is not a thin connecting section, the step is large and because of bad step coverage there is the problem of step cutting occurring in the wiring film.

A second aspect of the present invention is a semiconductor acceleration sensor which detects an applied acceleration from variation in a current between fixed electrodes, comprising a semiconductor substrate, a beam structure having a movable section disposed spaced at a predetermined distance above the semiconductor substrate, a movable electrode section being composed of one portion of the movable section, a pair of fixed electrodes of impurity diffusion layers formed in said semiconductor substrate so as to oppose to both sides of the movable electrode section, an underlying electrode of an impurity diffusion layer formed in a region of the semiconductor substrate where the underlying electrode faces the movable section while at least no fixed electrodes are provided to reduce electrostatic force produced between the movable section and the semiconductor substrate, and further characterized by a leakage current prevention region disposed between the fixed electrodes and the underlying electrode.

As an example of a leakage current prevention region, there is a thick oxide film for prevention of channel-formation. Furthermore, the impurity concentration of the semiconductor substrate can be increased locally to thereby make the threshold value high.

Further, by reducing the actual width of the movable electrode portion which is located between the fixed electrodes and the underlying electrode, a width of passage through which the leakage current flows may be narrowed to reduce the leakage current.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PRESENTLY PREFERRED EXEMPLARY EMBODIMENTS (First Embodiment)

A first embodiment according to this invention will be described hereinafter with reference to the drawings.

Figure 1:
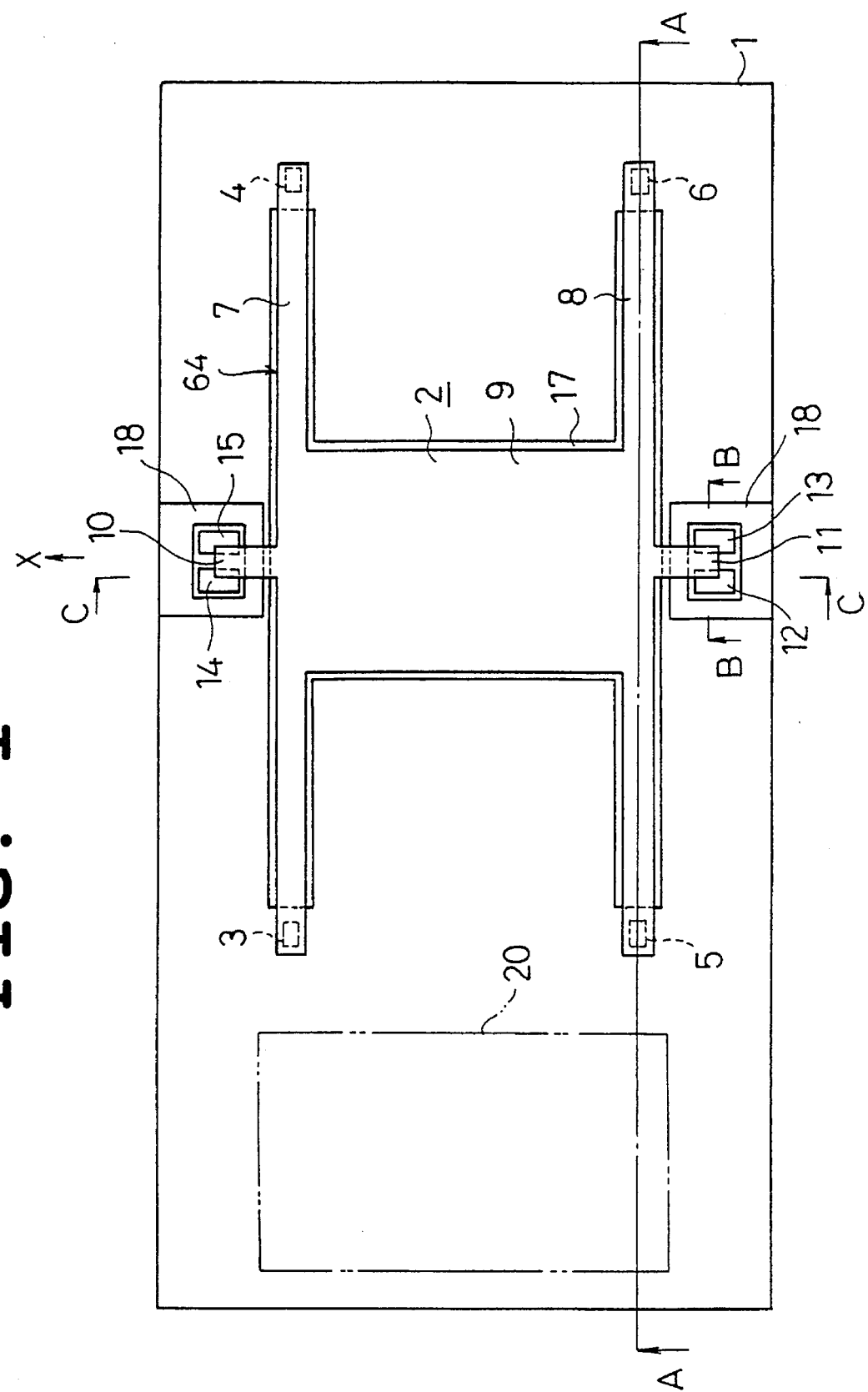
FIG. 1 is a plan view of a semiconductor acceleration sensor of a first embodiment of the present invention.
Figure 2:
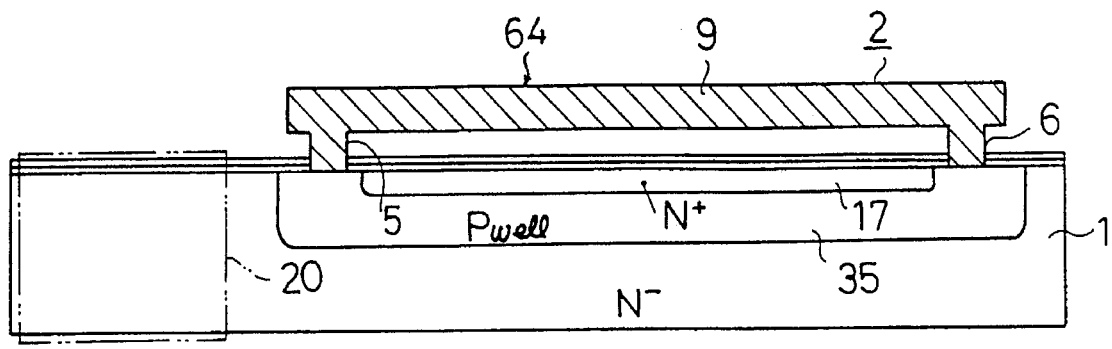
FIG. 2 is a sectional view taken along line A—A in FIG. 1.
Figure 3:
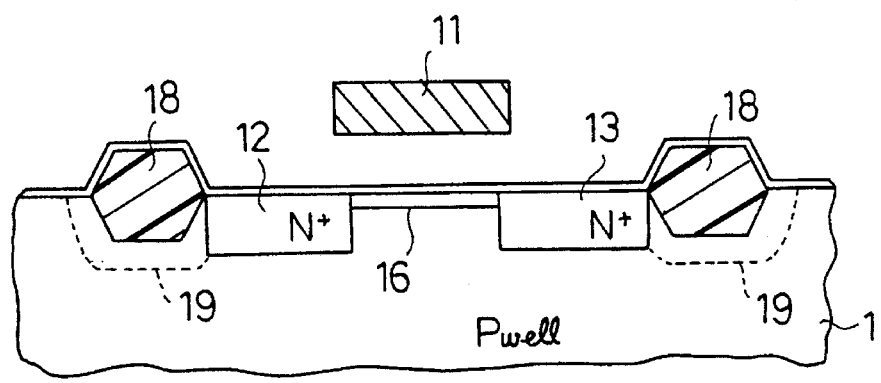
FIG. 3 is a sectional view taken along line B—B in FIG. 1.
Figure 4:
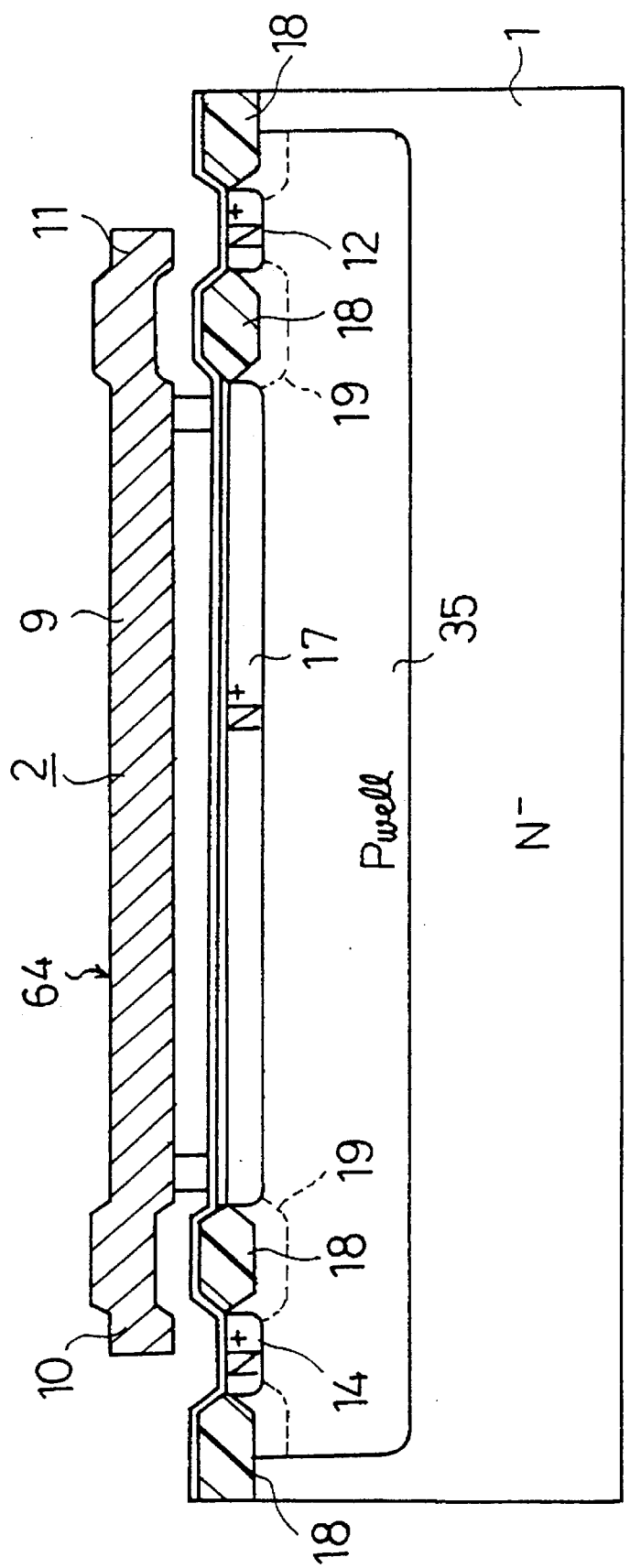
FIG. 4 is a sectional view taken along line C—C in FIG. 1.

FIG. 1 shows a plan view of a semiconductor acceleration sensor of the present embodiment. Further, the cross section A—A of FIG. 1 is shown in FIG. 2, the cross section B—B of FIG. 1 is shown in FIG. 3 and the cross section C—C of FIG. 1 is shown in FIG. 4.

The present embodiment is an MIS transistor-type semiconductor acceleration sensor. Using an N-type silicon substrate as a semiconductor substrate, a P well region 35 is formed and a beam structure 64 made from a polysilicon thin film is provided in the top surface of this P well region 35. The beam structure 64 is constructed from anchor sections 3, 4, 5 and 6, and a movable section 2 disposed spaced at a predetermined distance above silicon substrate 1. Furthermore, movable section 2 comprises beam sections 7 and 8, weight (mass) section 9 and movable electrode sections 10 and 11.

To be more specific, four anchor sections, 3, 4, 5 and 6, respectively, are protrudingly disposed on silicon substrate 1. Next, a belt-form beam section 7 is extended and spaced at a predetermined distance above silicon substrate 1 connecting anchor section 3 and anchor section 4. Further, another belt-form beam section 8 is extended and spaced at the predetermined distance above silicon substrate 1 connecting anchor section 5 and anchor section 6. A weight section 9 is disposed in a central portion in a lengthwise direction of both beam sections 7 and 8 at the predetermined distance above silicon substrate 1.

Furthermore, a lengthwise-shaped movable electrode section 10 is protrudingly disposed in a central portion in a lengthwise direction of beam section 7. In the same way, another lengthwise-shaped movable electrode section 11 is protrudingly disposed in a central portion in a lengthwise direction of beam section 8. As shown in FIG. 3, fixed electrodes 12 and 13 (made of an impurity diffusion layer) are formed in the surface of silicon substrate 1 so as to correspond to either side of the movable electrode section 11. Fixed electrodes 12 and 13 are formed by the introduction of N+ impurities into silicon substrate 1 by a method such as ion implantation. In the same way, as shown in FIG. 1, another pair of fixed electrodes 14 and 15, each being of an impurity diffusion layer, is formed in the surface of silicon substrate 1 to correspond to the other movable electrode section 10.

Further, as shown in FIG. 3, an inversion layer 16 is formed between electrodes 12 and 13 in silicon substrate 1, this inversion layer 16 develops as a result of a voltage being applied between silicon substrate 1 and movable electrode section 11. In the same way, an inversion layer (not shown) is formed between electrodes 14 and 15 in silicon substrate 1, this inversion layer develops as a result of a voltage being applied between silicon substrate 1 and movable electrode section 10.

Moreover, as shown in FIGS. 1 and 2, underlying electrode 17 is formed by means of an N+ impurity diffusion layer in a portion facing movable section 2 in silicon substrate 1 and not containing fixed electrodes 12, 13, 14 and 15. The underlying electrode is to reduce the electrostatic force occurring between silicon substrate 1 and movable electrode section 2 by having the same electric potential as movable section 2 (movable sections 10, 11).

As shown in FIGS. 3 and 4, surrounding fixed electrodes 12 and 13 and fixed electrodes 14 and 15, silicon oxide films 18 formed by means of a LOCOS method (hereinafter referred to LOCOS film) are provided, and below the respective LOCOS films 18, a channel stopper layer 19 is provided. Channel stopper layer 19 is formed by the implantation of a B (Boron) ion. In the present embodiment, a leakage current prevention member is constructed from this LOCOS film 18 and channel stopper layer 19.

Further, as shown in FIG. 1, peripheral circuit 20 is formed in silicon substrate 1; this peripheral circuit 20 and beam structure 64 are electrically connected, and peripheral circuit 20 and fixed electrodes 12, 13, 14 and 15 are electrically connected. Furthermore, peripheral circuit 20 and underlying electrode 17 are electrically connected.

Figure 5:
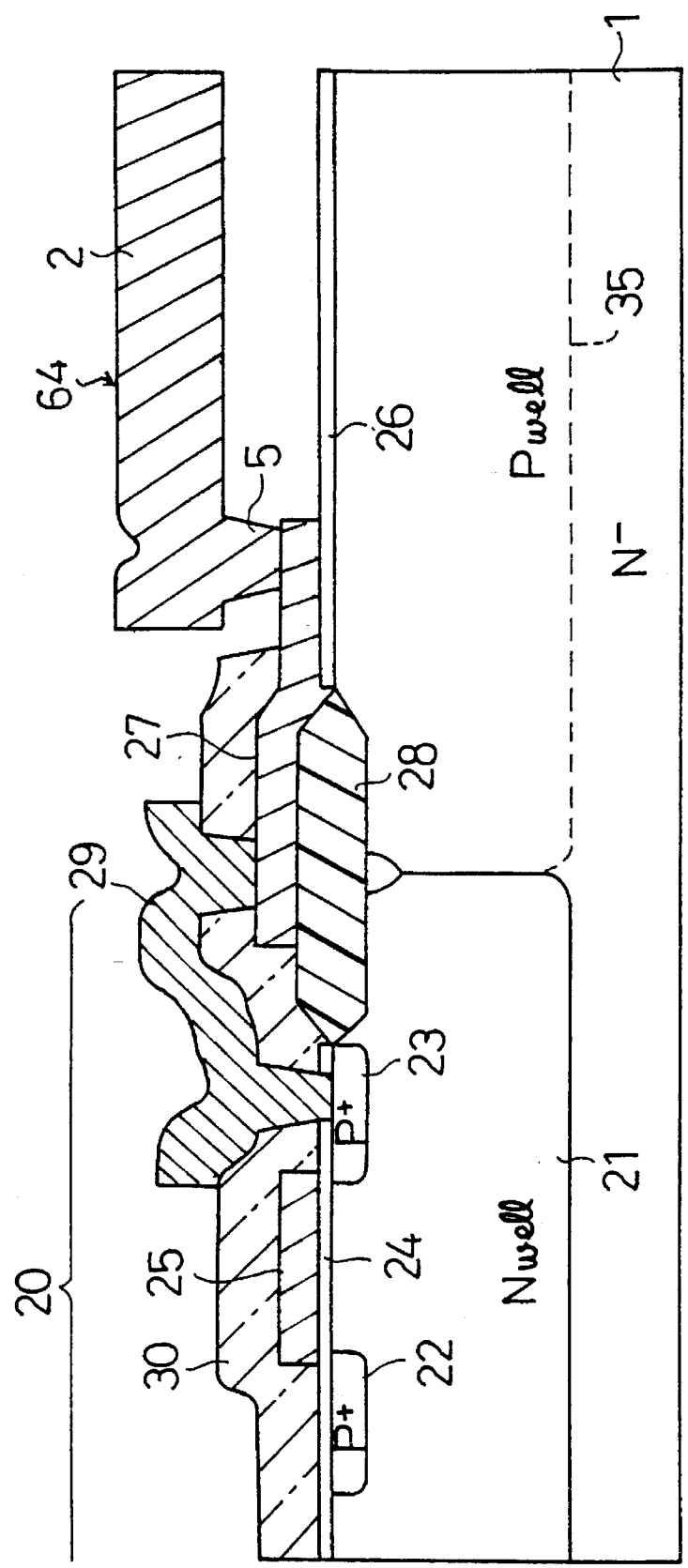
FIG. 5 is an enlarged view of part of a semiconductor acceleration sensor.

The construction of the electrical connection of peripheral circuit 20 and beam structure 64 is shown in FIG. 5. A MOS transistor is formed within a peripheral circuit 20. That is, an N well region 21 is formed within silicon substrate 1, a P+ source region 22 and a P+ drain region 23 are formed in the N well region 21 and a polysilicon gate electrode 25 is formed on a silicon oxide film 24 as a gate oxide film. Meanwhile, a silicon oxide film 26 is formed on the surface of silicon substrate 1 in a beam structure forming region. On top of that, an electro-conductive thin film 27 made of polysilicon is formed. On top of the electro-conductive thin film 27, the anchor section 5 of the beam structure 64 is disposed. Electro-conductive thin film 27 is also formed on LOCOS film 28 on silicon substrate 1. The end section of the electro-conductive thin film 27 is connected to a drain region 23 of the MOS transistor via an Al—Si film 29.

This construction is formed in the following way. First, source region 22 and drain region 23 of MOS transistor are formed in the surface of silicon substrate 1, utilizing well known semiconductor manufacturing technology. After that, a polysilicon thin film to become a polysilicon gate electrode 25 is deposited, and it is processed into the desired pattern to form polysilicon gate electrode 25. At this time, the polysilicon thin film also remains at the wiring points of beam structure 64 and peripheral circuit 20 and forms electro-conductive thin film 27. Next, a BPSG film 30 is deposited by a CVD method, the BPSG film 30 of the point connecting beam structure 64 is opened, a polysilicon film making beam structure 64 is deposited at around 600° C. and it is processed into the desired pattern. After that, the BPSG film 30 of the point connecting the Al—Si film 29 is opened, Al—Si film 29 is deposited by a spattering process and it is processed into the desired pattern. After this, the BPSG film 30 under movable section 2 is removed by etching and a condition of displacement is made possible. Finally, annealing is performed and ohmic contact is ensured.

Moreover, in the peripheral circuit 20, not only a MOS transistor, but a Bi-CMOS may also be built up.

Next, the operation of the acceleration sensor will be described.

A predetermined voltage is produced by peripheral circuit 20 and the predetermined voltage is applied to beam structure 64 passing through Al—Si film 29 and electro-conductive thin film 27 in FIG. 5. At this time, by using an electro-conductive thin film 27 made of polysilicon as a wiring material, a leakage current to the substrate 1 is prevented. Further, Al—Si film 29 is connected to electro-conductive thin film 27 from above of the electro-conductive thin film 27. Therefore, by disposing the electroconductive thin film 27 this way, wiring contact defects are at the same level as in peripheral circuit 20; namely, they do not occur.

In this way, a voltage is applied by the peripheral circuit 20 between beam structure 64 (movable electrode sections 10 and 11) and silicon substrate 1, a voltage is applied between fixed electrodes 12 and 13 and between fixed electrodes 14 and 15; inversion layer 16 is formed, and a current flows between fixed electrodes 12 and 13 and also between fixed electrodes 14 and 15. In the case where this acceleration sensor receives an acceleration and movable section 2 displaces in direction X shown in FIG. 1 (a direction parallel to the surface of substrate 1), the width of the inversion layer formation region (called the 'gate width' in a transistor) between fixed electrodes 12 and 13, and also between fixed electrodes 14 and 15 changes. The result is that the current flowing in fixed electrodes 12 and 13 is reduced and the current flowing between fixed electrodes 14 and 15 increases. The peripheral circuit 20 detects an acceleration by measuring these currents between the fixed electrodes.

Further, peripheral circuit 20 reduces the electrostatic force occurring between silicon substrate 1 and movable section 2 by making the electrical potential of the underlying electrode 17 the same as the electrical potential of beam structure 64 (movable electrode sections 10 and 11).

In this series of acceleration detection, of the LOCOS films 18 and channel stopper layers 19, those films and layers which surround fixed electrodes 12 and 13 and fixed electrodes 14 and 15 respectively, even when a voltage is applied to beam structure 64, no leakage current occurs between fixed electrodes (source, drain electrodes) 12, 13, 14 and 15 and underlying electrode 17; and stable sensor characteristics can be obtained.

Figure 24:
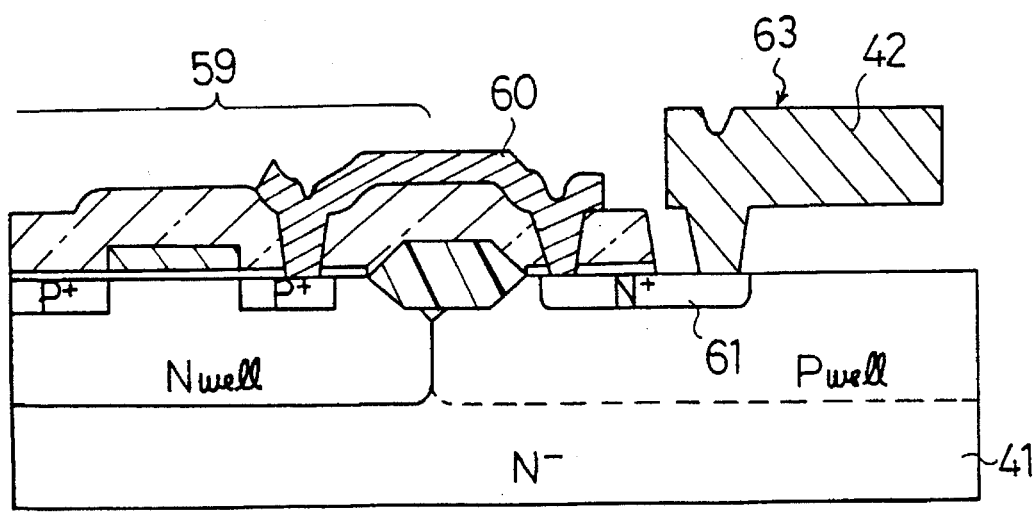
FIG. 24 is an enlarged view of part of a conventional semiconductor acceleration sensor.

In this way, in the present embodiment, as shown in FIG. 5, because beam structure 64 and peripheral circuit 20 are electrically connected by electro-conductive thin film 27 made of polysilicon in the present embodiment the occurrence of leakage current to the substrate is prevented; whereas in the case where impurity diffusion region 61 was utilized as shown in FIG. 24, leakage current to the substrate occurred. As a result, the predetermined voltage can be applied to beam structure 64.

Further, because electro-conductive thin film 27 is made of polysilicon, the same material as gate electrode 25 of the MOS transistor formed in the peripheral circuit, electro-conductive thin film 27 can be formed at the same time as the forming of gate electrode 25, and it is unnecessary to increase the number of manufacturing processes in order to form electro-conductive thin film 27.

Moreover, a leakage current prevention member made of LOCOS film 18 and channel stopper layer 19 is disposed between fixed electrodes 12–15 in silicon substrate 1 and underlying electrode 17. Further, even when a voltage is applied to movable section 2 which makes a gate section, the occurrence of leakage current between fixed electrodes (source, drain electrodes) 12–15 and underlying electrode 17 can be controlled, and stable sensor characteristics can be obtained.

Furthermore, the electro-conductive thin film 27 can use other gate electrode material such as aluminum or platinum, or a thin metal film such as an aluminum group metal, titanium, tungsten, chromium, silicon, zirconium, platinum or nickel.

(Second Embodiment)

A second embodiment will be described hereinafter mainly on the differences between it and the first embodiment.

Figure 6:
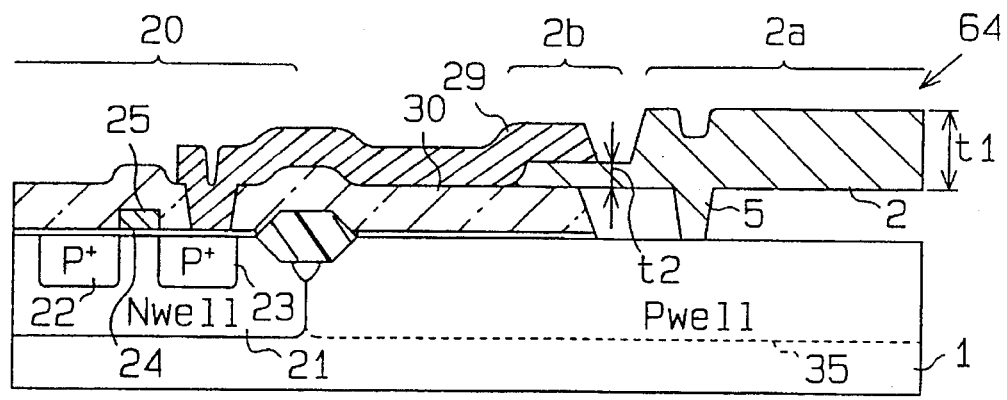
FIG. 6 is a sectional view of a semiconductor acceleration sensor of a second embodiment.

A semiconductor acceleration sensor of this embodiment is shown in FIG. 6. FIG. 6 corresponds to FIG. 5 in the first embodiment, showing the construction of an electrical connection between peripheral circuit 20 and beam structure 64.

AMOS transistor is formed in a peripheral circuit 20. That is, an N well region 21 is formed in a silicon substrate 1, a P+ source region 22 and a P+ drain region 23 are formed in N well region 21, and a polysilicon gate electrode 25 is formed on a silicon oxide film 24 as a gate oxide film. Meanwhile, anchor section 5 of beam structure 64 is formed in a beam structure forming region. This beam structure 64 is made of a polysilicon film, and a thin film thickness portion 2b which is serves as a connection portion is extended from a main body portion 2a of movable section 2. That is, a thin portion 2b with a film thickness t2 (e.g., 0.7 μm), thinner than the film thickness of main body portion 2a (e.g., 2 μm), is provided. The end of thin portion 2b of movable section 2 is disposed on top of a BPSG film 30. On top of thin portion 2b of movable section 2, an Al—Si film 29 extended from drain region 23 of MOS transistor of the peripheral circuit 20 is disposed, and peripheral circuit 20 and beam structure 64 are electrically connected only by this Al—Si film 29.

Figure 7:
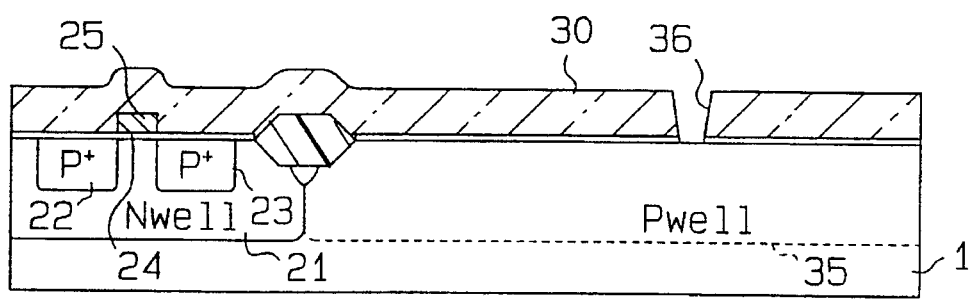
FIGS. 7 through 11 are sectional views showing the manufacturing processes of the semiconductor acceleration sensor of the second embodiment.
Figure 8:
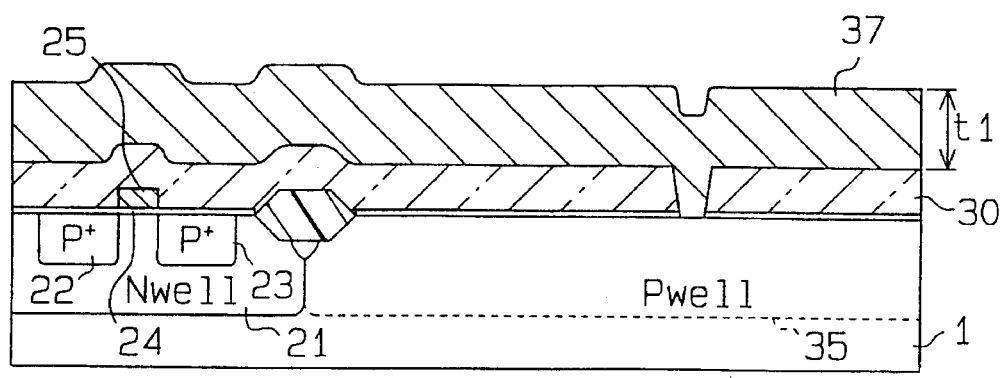

This construction is formed in the following way. First, as shown in FIG. 7, a MOS transistor source region 22 and drain region 23 are formed in the surface of silicon substrate 1, utilizing well known semiconductor manufacturing technology. After that, a silicon oxide film 24 is formed, then a polysilicon thin film is deposited and processed into the desired pattern, form polysilicon gate electrode 25. Next, BPSG film 30 is deposited by a CVD method or a spattering method, and a window 36 is formed by etching in BPSG film 30 at a point facing the anchor section 5 of beam structure 64. Then, as shown in FIG. 8, polysilicon film 37 which becomes beam structure 64 is deposited by an LPCVD method at around 600° C. At this time, the film thickness of polysilicon film 37 becomes t1 (e.g., 2 μm).

Figure 9:
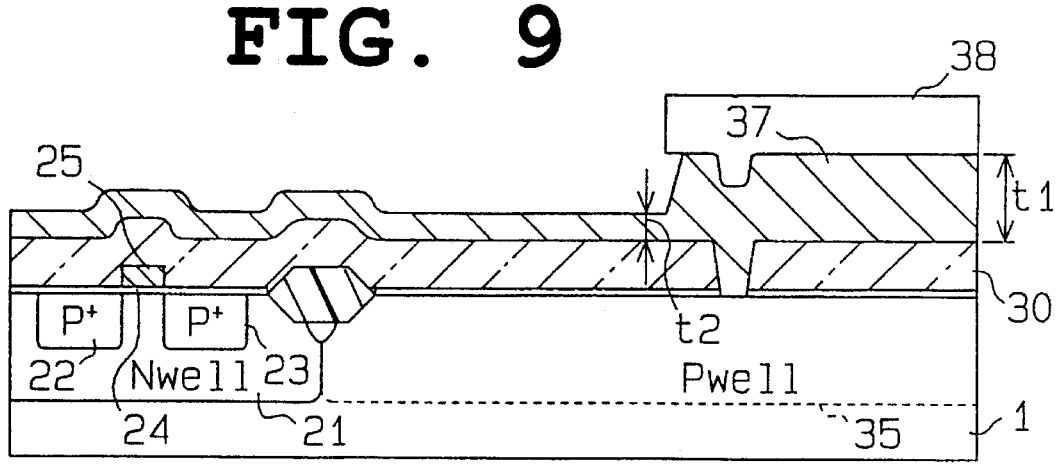
Figure 10:
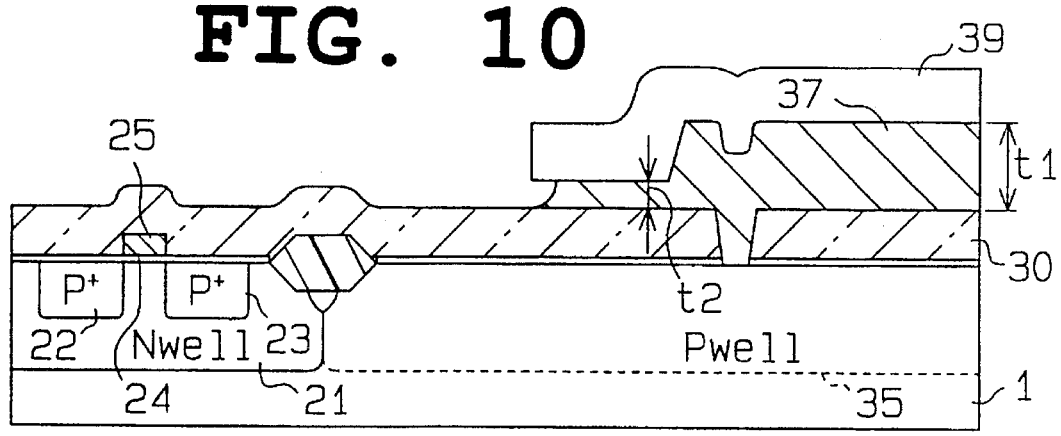

Next, as shown in FIG. 9, in the condition of masking the portion to make main body portion 2a of movable section 2 by photoresist 38, polysilicon film 37 is etched down to a predetermined thickness t2 (e.g., 0.7 μm). At this time, for example anisotropic etching by KOH or isotropic etching by fluoric and nitric (HF—HNO$_3$—H$_2$O$_2$) acids is utilized. Thus, as shown in FIG. 10, in the condition of masking the place which will become main body portion 2a of movable section 2 and the place which will become thin portion 2b, the deposited polysilicon film 37 of the other regions is stripped by isotropic etching. As a result, movable section 2, having main body portion 2a and thin portion for connection 2b, is patterned.

Figure 11:
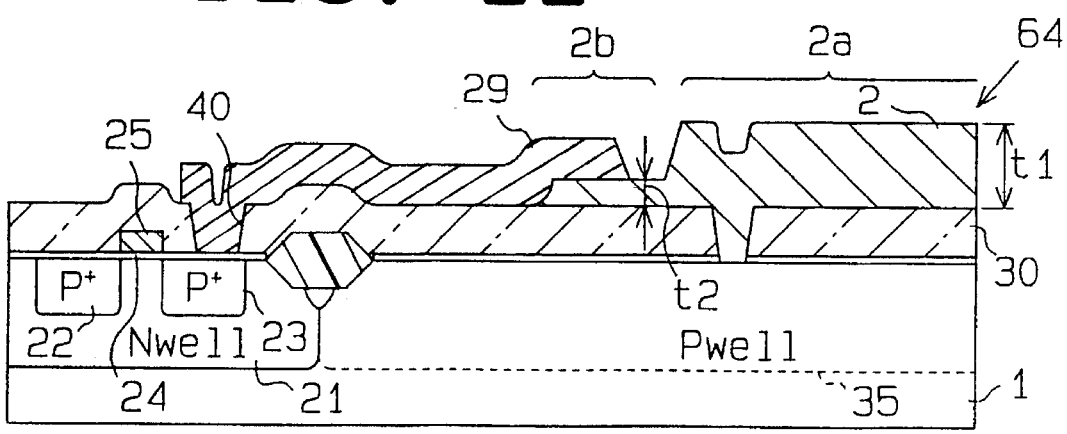

After that, as shown in FIG. 11, BPSG film 30 above the MOS transistor drain region 23 is etched and contact hole 40 is formed. Next, as a wiring film, Al—Si film 29 is deposited by spattering. At this time, Al—Si film 29 is also disposed above the movable section 2 including thin portion 2b. Because the film thickness of movable section 2 is made thin at portion 2b, there is no occurrence of step cutting of the Al—Si film 29.

Next, the Al—Si film 29 is processed into the desired pattern. Furthermore, as shown in FIG. 6, the BPSG film 30 below movable section 2 is etched utilizing HF based etching liquid, and movable section 2 is in a condition capable of displacement. At this time, at least the BPSG film 30 below Al—Si film 29 is retained. Finally, annealing such as aluminum sintering is performed, and ohmic contact is ensured.

In this way, in the present embodiment, beam structure 64 and peripheral circuit 20 are electrically connected by an Al—Si film 29 (wiring film) of one layer extended from peripheral circuit 20. That is, beam structure 64 and peripheral circuit 20 are electrically connected by an Al—Si film 29 formed by a one time film. Further, in addition to the prevention of occurrence of a leakage current in the same way as in the first embodiment, because there is only one electrical connection point in the wiring between Al—Si film 29 and beam structure 64, reliability is high and stable sensor characteristics can be obtained. Namely, in FIG. 24, the electrical connection points are two points: i.e., between beam structure 64 and impurity diffusion region 61, and between impurity diffusion region 61 and wiring material 60. Further, in FIG. 5, the electrical connection points are two points: i.e., between beam structure 64 and electro-conductive thin film 27, and between electro-conductive thin film 27 and Al—Si film 29. In contrast to this, in the present embodiment, there is only one electrical connection point; by keeping the electrical connection points in the wiring to the absolute minimum, reliability is high and stable sensor characteristics can be obtained.

Further, a portion for connection 2b with a thin thickness in comparison with the other portions is provided in one portion of beam structure 64 and disposed on BPSG film 30 (insulation film) to connect beam structure 64 with Al—Si film 29 (wiring film) extending from peripheral circuit 20. Therefore, in the case where Al—Si film 29 is disposed on the beam structure 64; because the connection point of beam structure 64 to Al—Si film 29 is thinned, the step becomes small and cutting of Al—Si film 29 does not occur. On the other hand, when the connection point of beam structure 64 to Al—Si film 29 is not thinned, the step is large and step coverage is bad, thereby causing the occurrence of cutting in the Al—Si film 29.

Furthermore, the following method is adopted as a manufacturing method of a semiconductor acceleration sensor having this kind of construction. That is, a BPSG film 30 (insulation film) is formed on a silicon substrate 1 (semiconductor substrate) and a polysilicon film 37 (beam structure forming film) is formed on top of this BPSG film 30 (First Process); polysilicon film 37 is etched to a prescribed thickness in a condition with beam structure 64 forming portion in polysilicon film 37 (excepting the portion making junction 2b) being masked (Second Process); polysilicon film 37 is stripped by etching with beam structure 64 forming portion in polysilicon film 37 masked (Third Process); an Al—Si film 29 (thin film wiring material) electrically connecting a point in polysilicon film 37 making junction 2b and a peripheral circuit 20 is formed (Fourth Process); BPSG film 30 under polysilicon film 37 (except for at least the points of disposing Al—Si film 29) is removed by etching and beam structure 64 is formed (Fifth Process). Therefore, due to the disposition of Al—Si film 29 on a portion making thin portion 2b in the Fourth Process, the step is small and cutting of Al—Si film 29 does not occur.

In this way, in the case where the film thickness of polysilicon film 37 making movable section 2 is thick, it is possible to take precautions to prevent cutting of the wiring film (Al—Si film 29) by performing two-stage etching; etching forming thin portion 2b, and etching patterning all of movable section 2.

Further, as a thin film wiring material, a pure aluminum film or an aluminum alloy film etc. are used. As this aluminum alloy film, there are such as Al—Cu film, Al—Si—Cu film and Al—Si film.

Moreover, in the peripheral circuit 20, apart from a MOS transistor, a Bi-CMOS or bipolar transistor may also be built up.

(Third Embodiment)

Next, a third embodiment will be described on the differences between it and the first embodiment.

Figure 12:
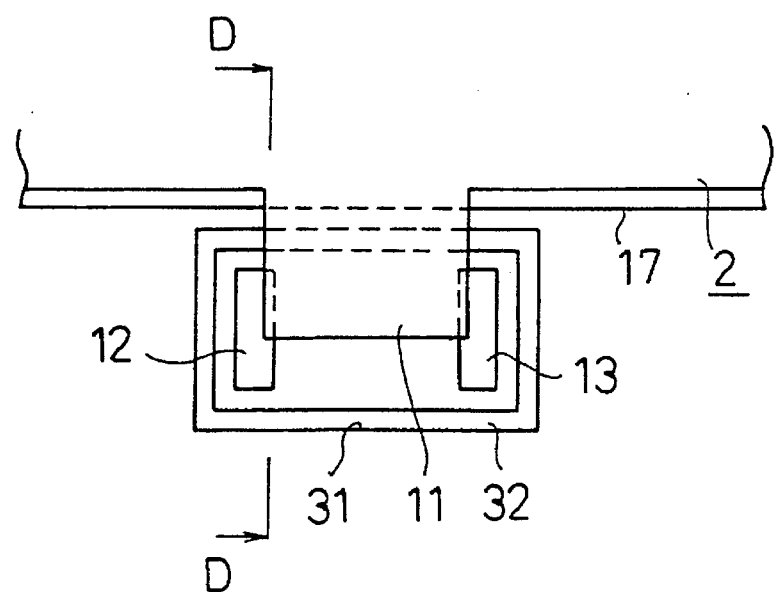
FIG. 12 is a plan view of a semiconductor acceleration sensor of a third embodiment.
Figure 13:
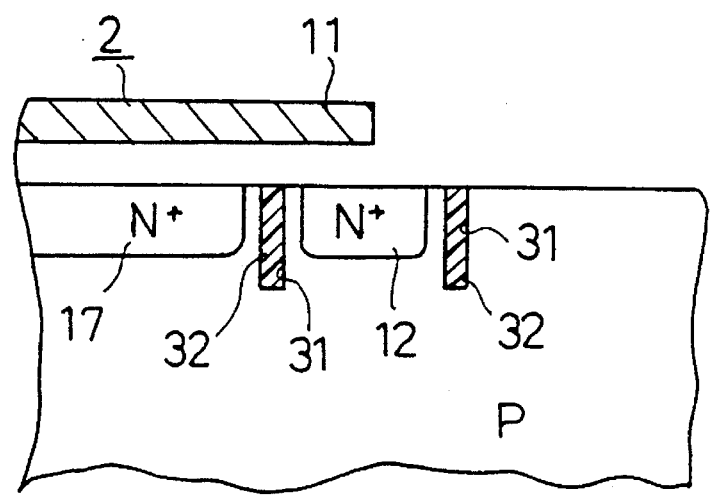
FIG. 13 is a sectional view taken along line D—D in FIG. 12.

In the aforementioned first embodiment, LOCOS film 18 and channel stopper layer 19 were utilized for controlling leakage current flowing between fixed electrodes 12–15 and underlying electrode 17. In the present embodiment, the construction in FIGS. 12 and 13 is adopted. Further, FIG. 12 shows a plan view of the sensor, FIG. 13 shows cross section D—D in FIG. 12.

That is to say, as a leakage current prevention member, trench 31 is formed so as to surround a pair of fixed electrodes 12 and is 13 and filled with an insulation film 32 such as a silicon oxide. By doing so in this way, the occurrence of leakage current is prevented.

(Fourth Embodiment)

Next, a fourth embodiment will be described on the differences between it and the first embodiment.

Figure 14:
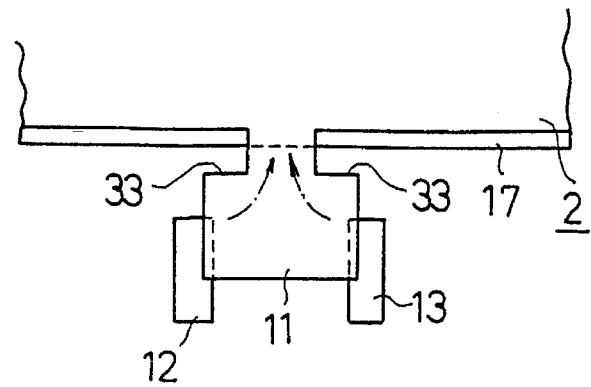
FIG. 14 is a plan view of a semiconductor acceleration sensor of a fourth embodiment.
Figure 15:
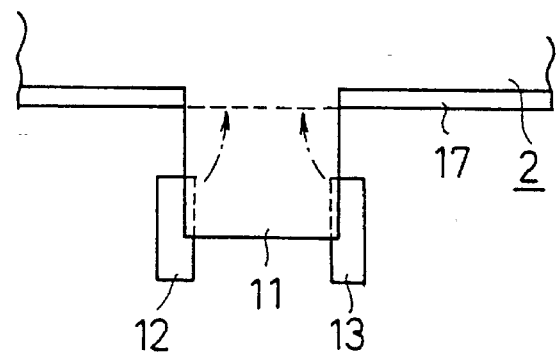
FIG. 15 is a plan view of a semiconductor acceleration sensor for comparative purposes.

As shown in FIG. 14, cutting portions 33 are formed from both sides facing movable electrode section 11 between fixed electrodes 12 and 13 and underlying electrode 17, and that width becomes narrow. By doing so in this way, as shown in FIG. 15, compared to a case where there are no cutting portions, the leakage current passage becomes narrow and leakage current can be reduced. That is to say, the channel width of the transistor parasitically formed between underlying electrode 17 and fixed electrodes 12 and 13 becomes narrow and leakage current is reduced.

Figure 16:
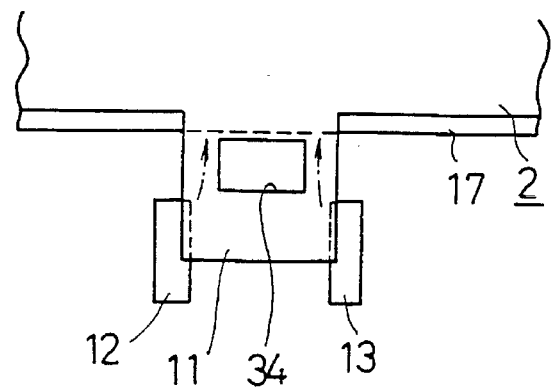
FIG. 16 is a plan view of a semiconductor acceleration sensor of an applied example of the fourth embodiment.

As an application of the present embodiment, as in FIG. 16, this actual width can be made narrow by forming a penetrating hole 34 in movable electrode section 11 between fixed electrodes 12 and 13 and underlying electrode 17.

Further, by making the impurity concentration of the substrate higher locally as a channel stopper corresponding to the channel formation region of the parasitic transistor, a leakage current reduction effect can be obtained.

Figure 18:
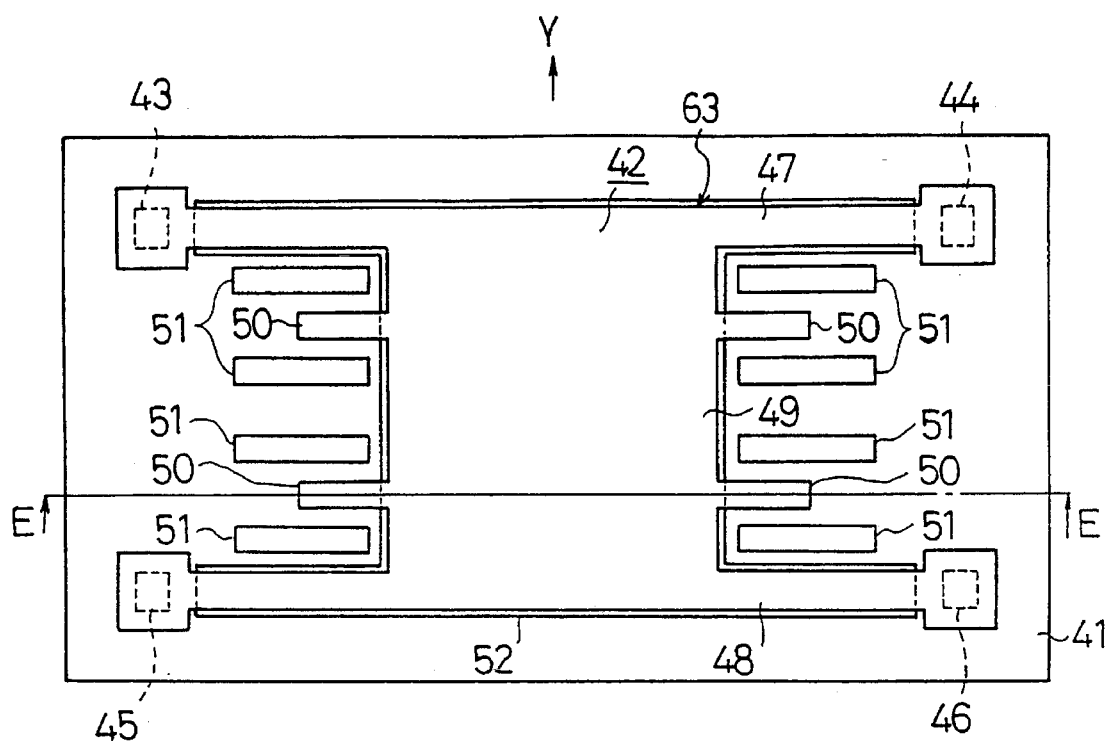
FIG. 18 is a plan view of a semiconductor acceleration sensor for describing the related art.
Figure 19:
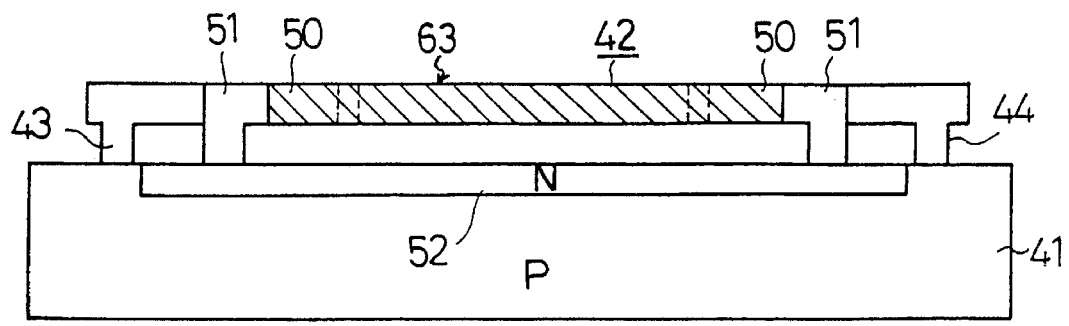
FIG. 19 is a sectional view taken along E—E line of FIG. 18.
Figure 20:
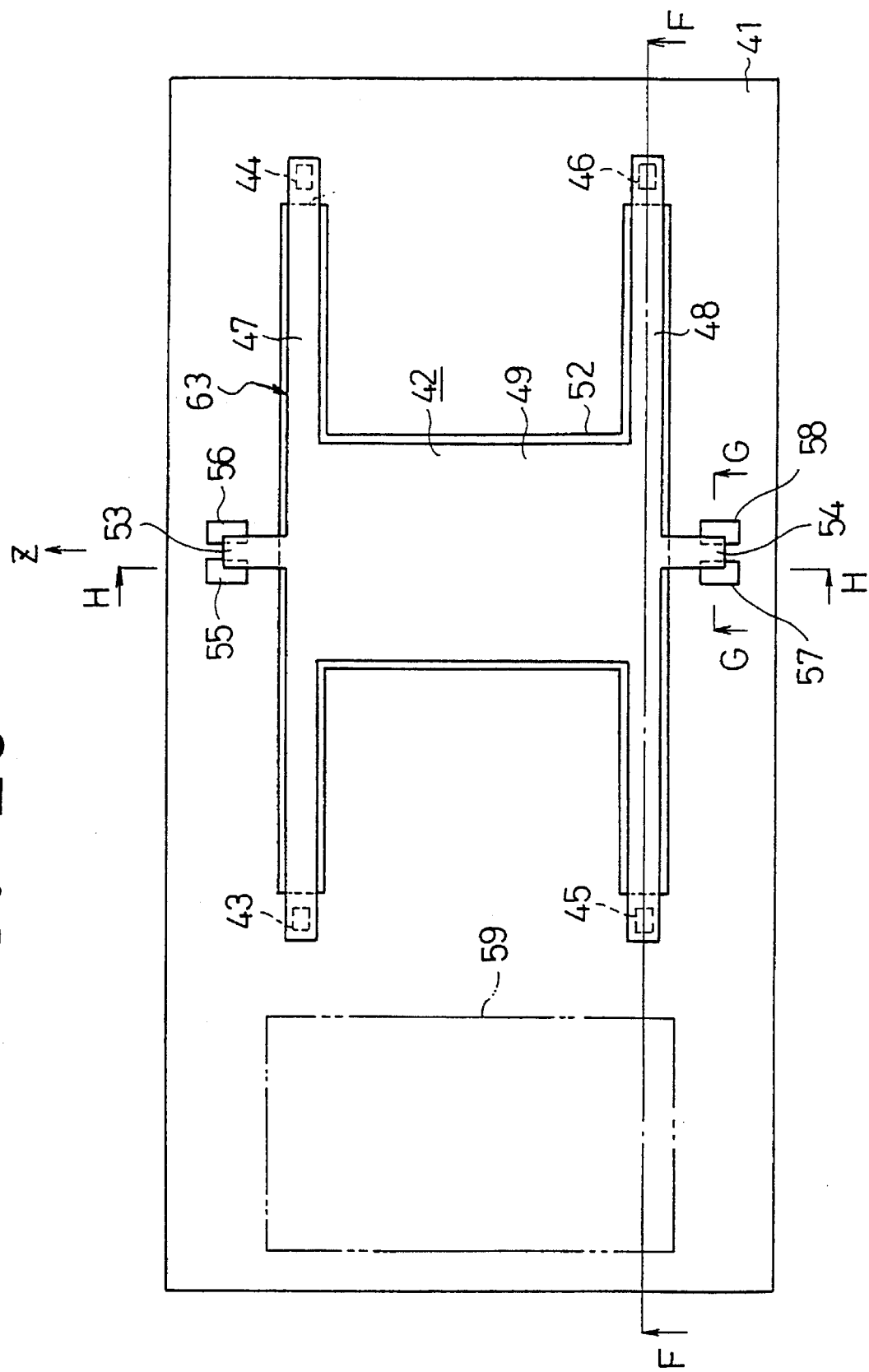
FIG. 20 is a plan view of a semiconductor acceleration sensor of the prior work.
Figure 21:
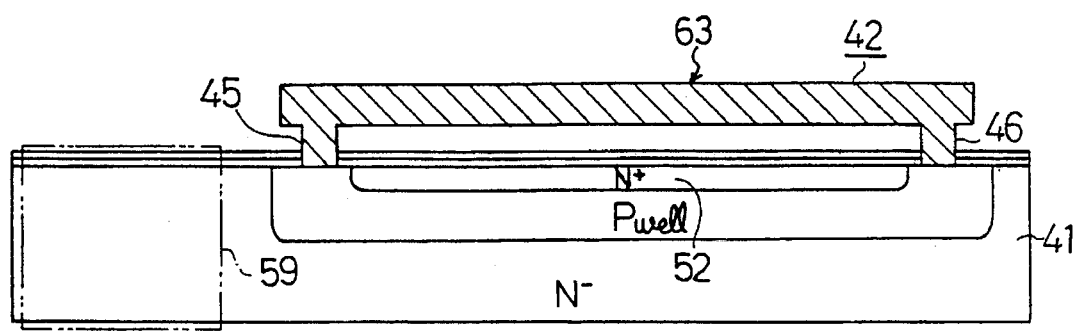
FIG. 21 is a sectional view taken along F—F line of FIG. 20.
Figure 22:
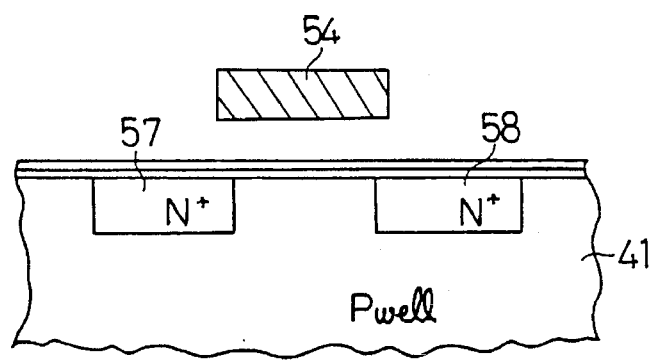
FIG. 22 is a sectional view taken along G—G line of FIG. 20.
Figure 23:
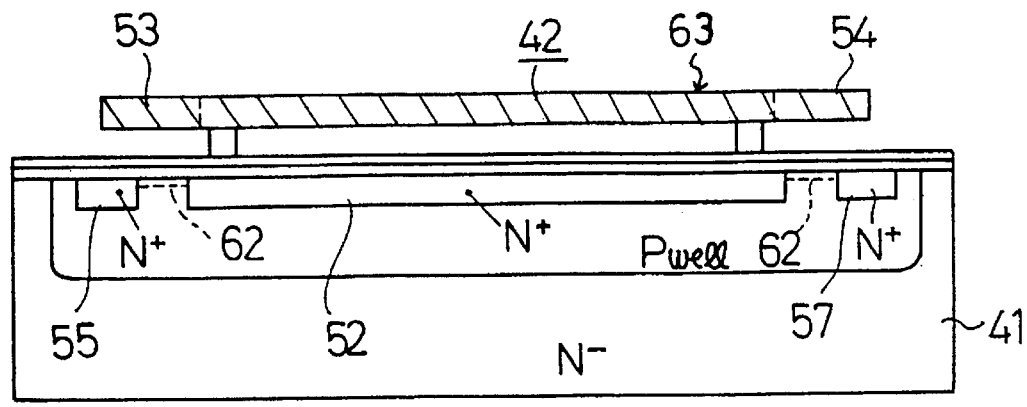
FIG. 23 is a sectional view taken along H—H line of FIG. 20.

Moreover, apart from each of the above mentioned embodiments, an embodiment in the following fashion may be also possible. For example, it is possible to realize the cases wherein a beam structure 63 and a peripheral circuit in a differential capacity-type semiconductor acceleration sensor shown in FIG. 18 are electrically connected by means of an electro-conductive thin film 27 shown in FIG. 5, or are electrically connected by a single-layer wiring film 29 shown in FIG. 6.

Figure 17:
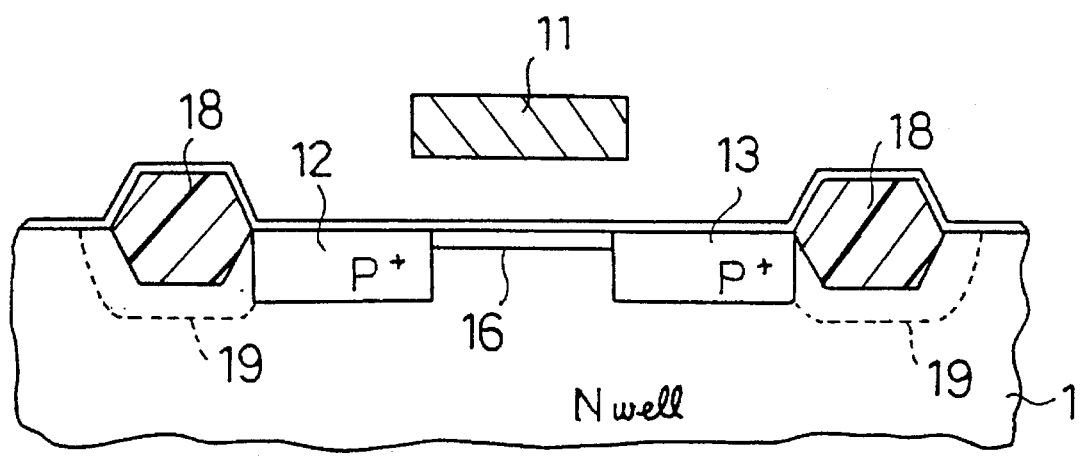
FIG. 17 is a sectional view of a semiconductor acceleration sensor of another applied example.

Furthermore, it is possible to realize the previously mentioned embodiment in the way shown in FIG. 3 with an N channel MOS transistor or, in the way shown in FIG. 17, with a P channel MOS transistor.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A semiconductor acceleration sensor comprising:

a semiconductor substrate;

a beam structure having a movable section disposed and spaced at a predetermined distance above said semiconductor substrate;

a peripheral circuit formed in said semiconductor substrate, electrically connected to said beam structure, whereby an applied acceleration is detected from a displacement of a movable section; and a connection member, for electrically connecting said beam structure and said peripheral circuit, consisting of at least one electroconductive thin film formed above said semiconductor substrate.

2. A semiconductor acceleration sensor as set forth in claim 1, wherein said electroconductive thin film is of the same material as a gate electrode of a MOS transistor formed in a peripheral circuit.

3. A semiconductor acceleration sensor as set forth in claim 1, wherein said electroconductive thin film is a wiring film extended from said peripheral circuit.

4. A semiconductor acceleration sensor as set forth in claim 3, wherein said beam structure has a connection portion with a thin thickness in comparison with the other portion thereof, said connection portion being disposed on an insulation film, and wherein, on top of said connection portion, a wiring film extended from said peripheral circuit is disposed.

5. A semiconductor acceleration sensor which detects an acceleration from a displacement in a movable section, comprising:

a semiconductor substrate;

a beam structure having a movable section disposed and spaced at a predetermined distance above said semiconductor substrate;

a peripheral circuit formed in said semiconductor substrate; and an electroconductive material extended from said peripheral circuit and electrically connected to said peripheral circuit and said beam structure, wherein said beam structure is electrically connected on top of said electroconductive material.

6. A semiconductor acceleration sensor according to claim 5, wherein said electroconductive material is exposed in a connection portion connected to said beam structure.

7. A semiconductor acceleration sensor according to claim 5, wherein said electroconductive material is of the same material as a gate electrode of a MOS transistor formed in said peripheral circuit.

8. A semiconductor acceleration sensor according to claim 5, wherein said electroconductive material is selected from a group consisting of polysilicon, aluminum, platinum, titanium, tungsten, chrome silicon, zirconium and nickel.

9. A semiconductor acceleration sensor which detects an acceleration from a displacement in a movable section, comprising:

a semiconductor substrate;

a beam structure having a movable section disposed and spaced at a predetermined distance above said semiconductor substrate, said beam structure having a thinned portion in thickness;

a peripheral circuit formed in said semiconductor substrate; and an electroconductive material extended from said peripheral circuit for electrically connecting said peripheral circuit and said beam structure, wherein said electroconductive material is extended on top of and electrically connected to said thinned portion of said beam structure.

10. A semiconductor acceleration sensor according to claim 9, wherein said electroconductive material and said thinned portion of said beam structure are disposed on top of an insulation film.

11. A semiconductor acceleration sensor according to claim 9, wherein said electroconductive material is of an aluminum-based metal wiring formed in said peripheral circuit.

\* \* \* \* \*